(12) United States Patent
Binder

(10) Patent No.: US 11,336,152 B2
(45) Date of Patent: May 17, 2022

(54) SLIP RING UNIT WITH ACTIVE COOLING SYSTEM

(71) Applicant: SIEMENS AKTIENGESELLSCHAFT, Munich (DE)

(72) Inventor: Herbert Binder, Neuburg (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 16/977,766

(22) PCT Filed: Jan. 24, 2019

(86) PCT No.: PCT/EP2019/051735
§ 371 (c)(1),
(2) Date: Sep. 2, 2020

(87) PCT Pub. No.: WO2019/170318
PCT Pub. Date: Sep. 12, 2019

(65) Prior Publication Data
US 2021/0013779 A1    Jan. 14, 2021

(30) Foreign Application Priority Data

Mar. 8, 2018 (EP) ..................... 18160756

(51) Int. Cl.
*H02K 9/28* (2006.01)
*H02K 9/06* (2006.01)
*H02K 13/00* (2006.01)

(52) U.S. Cl.
CPC ............. *H02K 9/28* (2013.01); *H02K 9/06* (2013.01); *H02K 13/003* (2013.01)

(58) Field of Classification Search
CPC ........... H02K 9/28; H02K 9/06; H02K 13/003
USPC ........................................................ 310/62
See application file for complete search history.

(56) References Cited

U.S. PATENT DOCUMENTS

| 2,560,784 A | * | 7/1951 | Sears | ................. | H02K 9/06 310/227 |
| 4,250,422 A | * | 2/1981 | Tahara | ................. | H02K 9/28 310/227 |

FOREIGN PATENT DOCUMENTS

| DE | 853 474 C | 10/1952 |
| DE | 10 2010 016 930 A1 | 1/2011 |
| JP | H07 123648 A | 5/1995 |
| JP | H07123648 | * 5/1995 |

(Continued)

OTHER PUBLICATIONS

PCT International Search Report and Written Opinion of International Searching Authority dated Jun. 5, 2019 corresponding to PCT International Application No. PCT/EP2019/051735 filed Jan. 24, 2019.

*Primary Examiner* — Ahmed Elnakib
(74) *Attorney, Agent, or Firm* — Henry M. Feiereisen LLC

(57) ABSTRACT

A slip ring unit for an electrical machine includes a brush holding apparatus including brush boxes configured to receive slip ring brushes. For realizing an effective cooling of the slip ring brushes, the brush holding apparatus has cooling air lines for the targeted supply of cooling air to the slip ring brushes, and cooling air ducts which each have an air inlet opening for collecting cooling air and an air outlet opening for supplying the cooling air which is collected in the cooling air ducts to the slip ring brushes via the cooling air lines which are connected to the air outlet openings.

8 Claims, 3 Drawing Sheets

(56) References Cited

FOREIGN PATENT DOCUMENTS

JP   2002 130192 A   5/2002

\* cited by examiner

SLIP RING UNIT WITH ACTIVE COOLING SYSTEM

CROSS-REFERENCES TO RELATED APPLICATIONS

This application is the U.S. National Stage of International Application No. PCT/EP2019/051735, filed Jan. 24, 2019, which designated the United States and has been published as International Publication No. WO 2019/170318 A1 and which claims the priority of European Patent Application, Serial No. 181607565.5, filed Mar. 8, 2018, pursuant to 35 U.S.C. 119(a)-(d).

BACKGROUND OF THE INVENTION

The invention relates to a slip ring unit for an electrical machine, wherein the slip ring unit is provided for receiving a brush holding apparatus. The invention further relates to an electrical machine with a slip ring unit of this type.

A slip ring unit of this type for an electrical machine is used for example in wind turbines. The requirement here is for the electrical machines in the form of the generators and components thereof to become ever more compact. This means that although the unit remains the same size the stresses on the slip ring components become ever greater, since the temperatures, in particular of slip rings, slip ring brushes and slip ring brush holders, frequently rise sharply. Thus there is a need to cool all components of the electrical machine, in particular including the slip ring unit, as efficiently as possible.

The object of the invention is to improve a slip ring unit of this type such that an even temperature distribution of the slip ring unit is enabled in a simple and inexpensive manner and thus as effective a cooling of the electrical machine as possible.

SUMMARY OF THE INVENTION

This object is achieved by a slip ring unit for an electrical machine, wherein the slip ring unit is provided for receiving a brush holding apparatus, wherein the brush holding apparatus has cooling air lines for the targeted supply of cooling air to slip ring brushes that can be arranged in the brush holding apparatus, wherein the brush holding apparatus has cooling air ducts, each of which has at least one air inlet opening for collecting cooling air and each at least one air outlet opening for supplying the cooling air collected in the cooling air ducts via the cooling air lines connected to the air outlet openings to the slip ring brushes, each of which can be arranged in brush boxes of the brush holding apparatus.

The invention is based on the recognition that the thermal behavior of an electrical machine can be optimized in that cooling air lines are selectively provided, for the targeted guidance of cooling air to slip ring brushes that can be arranged in the brush holding apparatus. Thanks to cooling air lines of this type the thermal behavior of the slip ring unit and thus also of the electrical machine can be optimized such that the slip ring unit selected can be smaller than would be the case without an active cooling system with cooling air lines provided on or in the brush holding apparatus. The additional complexity of cooling air lines entails low material costs here compared to higher material costs resulting from larger dimensions of a complete electrical machine. The targeted cooling of the slip ring brushes means a significant reduction in the temperatures in this region, such that as a result of the lower temperature the slip ring unit and the directly adjacent components can be smaller in size. In addition the slip ring body or the slip ring unit can be operated with more brushes per phase, which otherwise would be difficult or even impossible without direct and active cooling of the brushes. Thus smaller units are possible with the same power level.

Advantageous embodiments are contained in the subclaims.

A targeted supply of a cooling air flow to regions of the slip ring unit subject to high temperatures, in particular in the region of the slip ring brushes, can advantageously be selectively achieved in that the brush holding apparatus has cooling air ducts, each of which has at least one inlet opening for collecting cooling air and each at least one air outlet opening for supplying the cooling air collected in the air ducts via the cooling air lines connected to the air outlet openings to the slip ring brushes, each of which can be arranged in brush boxes. This results in a targeted interaction of the cooling air lines with cooling air ducts arranged in the brush holding apparatus.

The cooling air flow can easily be achieved with minimum effort in that the slip ring unit has a fan and/or can be coupled to a fan. In this case the fan of the electrical machine, which in particular is present in any case, is provided to generate an air volume flow to cool the brush holding apparatus.

The cooling air flow is advantageously achieved in that the slip ring unit has a slip ring housing, wherein the slip ring housing has an air inlet opening for feeding cooling air via a supply air duct to the cooling air duct.

The cooling air duct can be created synergistically without great additional effort in that the cooling air duct is embodied as part of a brush bridge. A brush bridge of this type is usually required in any case to connect the individual brush holders.

A dual functionality of this type in the form of a mechanical coupling and as a targeted air supply is ensured simply by the brush bridge having a first subregion for the electrical wiring of the slip ring brush and a second subregion which acts as a cooling air duct.

BRIEF DESCRIPTION OF THE DRAWING

The invention is described and explained in more detail below on the basis of the exemplary embodiments shown in the figures.

In the drawings.

DETAILED DESCRIPTION OF PREFERRED EMBODIMENTS

Figure 1:
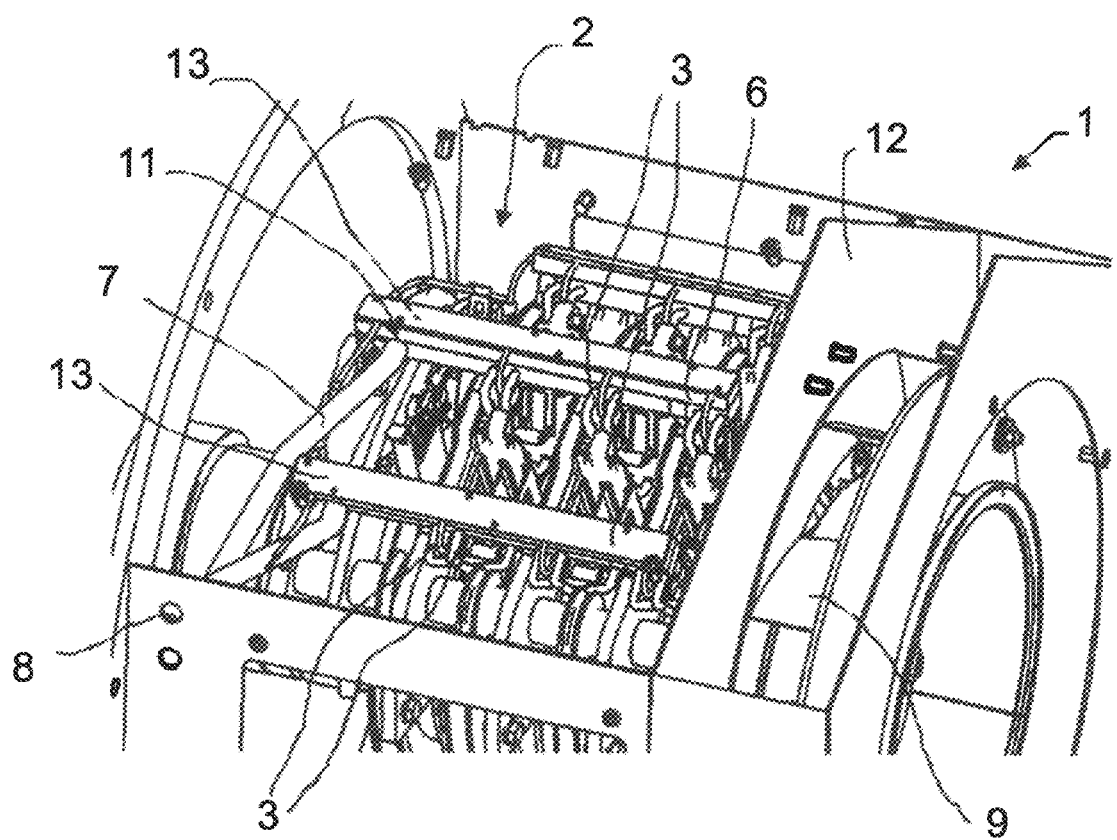
FIG. 1 shows a section of a slip ring unit with an active cooling system.

FIG. 1 shows a section of a slip ring unit 1 with an active cooling system. The slip ring unit 1 substantially consists of a slip ring housing 12 in which a brush holding apparatus 2 and a fan 9 are arranged. The slip ring housing 12 has an air inlet opening 8 in the front region, which is actively coupled via a supply air duct 7 to a cooling air duct 6 of a brush bridge 13.

The special feature of the slip ring unit with an active cooling system illustrated in FIG. 1 that in the case of the slip ring unit 1 targeted cooling takes place of the slip ring brushes not illustrated in greater detail in FIG. 1 for reasons of clarity. To this end cooling air is selectively fed via the air inlet opening 8 and the supply air ducts 7 connected thereto to the cooling air duct 6 of the brush bridge 13. This cooling air volume flow is then forwarded via air outlet openings 10 on the cooling air duct 6 and the cooling air lines 3 connected to the air outlet openings 10 (see also FIG. 3). The cooling air lines 3 channel this cooling air flow directly to the slip ring brushes not illustrated in greater detail in FIG. 1. Thus in interaction with the fan 9, which substantially serves to dispel the heated air, an active cooling system is created, such that overheating is prevented and temperature ranges also permissible for all operating states are achieved.

The cool air is thus drawn in on one side via the cooling air openings of the slip ring unit 1. The second path is formed via the supply air ducts 7 which are supplied via separate cooling air openings in the form of the air inlet 8 on the slip ring unit 1. Because of these separate additional ducts on the brush bridge 13, each individual brush can also be supplied from here individually with cooling air. This is the purpose of the separate cooling air pipe systems in the form of cooling air lines 3.

In the exemplary embodiment illustrated in FIG. 1 the supply of the cooling air takes place via the cooling air duct 6 integrated into the brush bridge 13. Alternatively an active cooling air supply could also be integrated into the slip ring casing and not into the brush bridge 13. With the aid of this cooling air guidance the cooling air can now be channeled directly to each contact point of each slip ring brush in the complete system. As a result the surfaces of the critical parts lie directly in the cooling air flow which is supplied. This is supported by the radial fan 9 contained in the slip ring unit 1 as standard. The cooling air is thus guided directly to the "hot" spots in the system, in other words to the slip ring brushes. The heated air is now drawn in by the slip ring fan 9 and discharged via the air flow through the fan housing out of the slip ring chamber into the environment. Thus the slip ring brushes of the slip ring unit 1 are cooled directly. Thanks to these measures the slip ring contact surfaces and brush temperatures remain in an operationally appropriate temperature range and operation is protected against overheating. Thus significantly smaller, more advantageous components can be used while at the same time ensuring problem-free operation.

Figure 2:
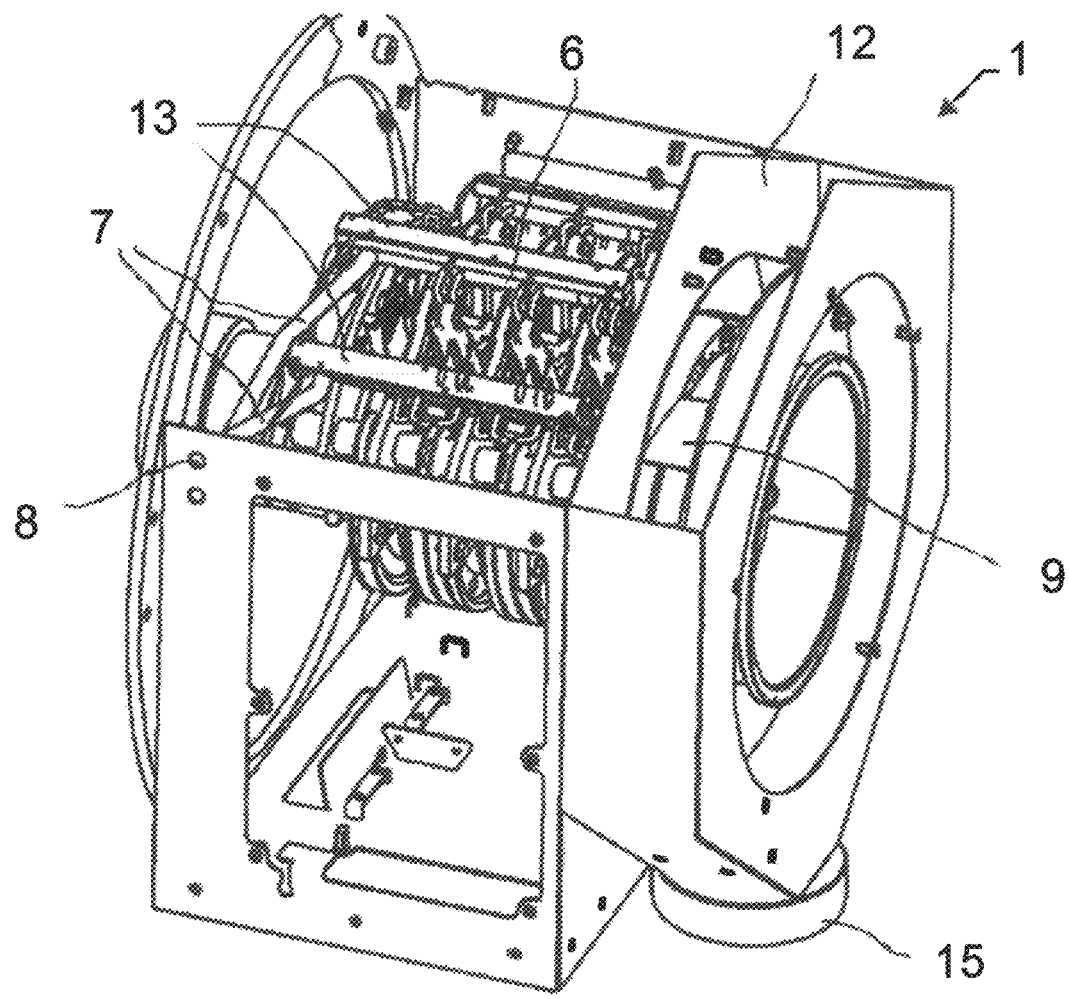
FIG. 2 shows a slip ring unit with an active cooling system in an overall view and FIG. 3 shows a detailed view of a brush holding apparatus with cooling air duct and associated cooling air lines.

FIG. 2 shows a slip ring unit 1 with an active cooling system in the overall view. The reference characters introduced in connection with FIG. 1 are used again here, so that reference is also made to the associated description for FIG. 1 to avoid repetitions. In FIG. 2 the interaction with the fan 9 is again apparent, said fan 9 conveying the heated air out of the housing 12 of the slip ring unit 1 via an air outlet 15.

Figure 3:
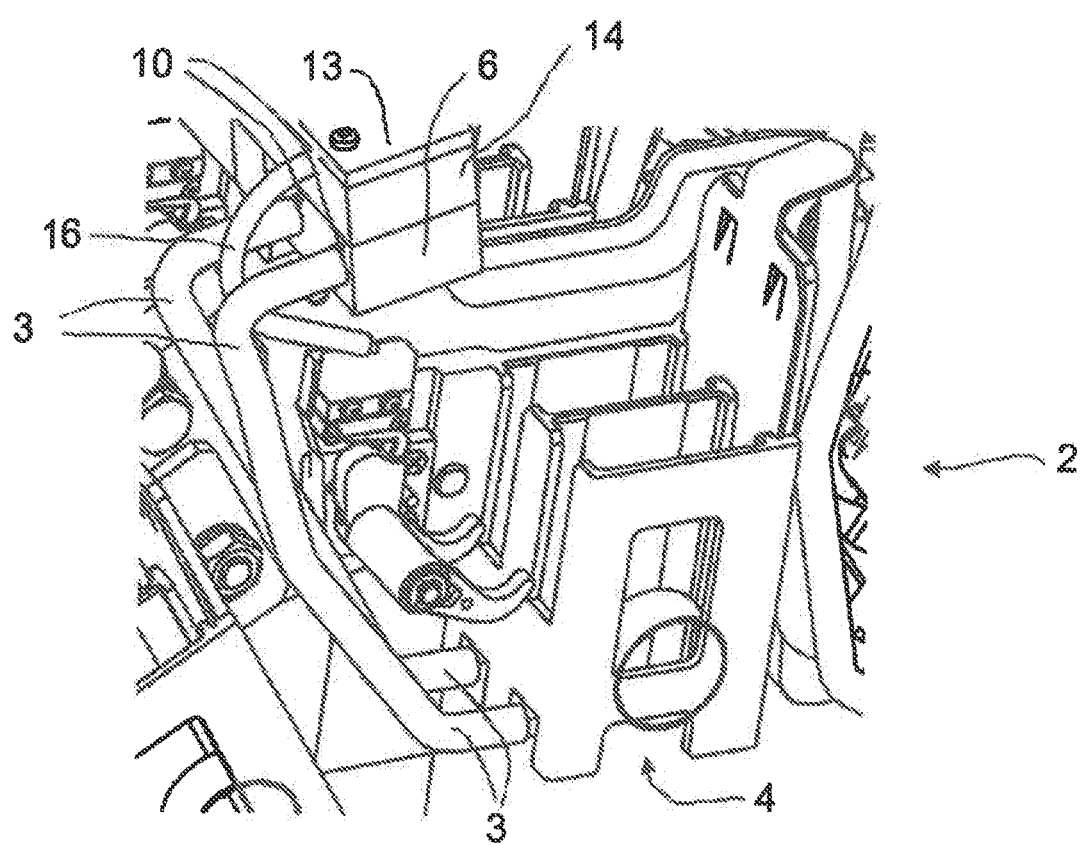

FIG. 3 shows a detailed view of a brush holding apparatus 2 with cooling air duct 6 and associated cooling air ones 3. The reference characters already introduced in connection with FIGS. 1 and 2 are used here again. It is in particular apparent from this detailed view in FIG. 3 that the brush bridge has a first subregion 14 for the electrical wiring of the slip ring brush via cabling 16, which slip ring brush is arranged in the region of a brush box 4, as well as a second subregion which acts as a cooling air duct 6.

In summary, the invention thus relates to a slip ring unit 1 for an electrical machine, wherein the slip ring unit 1 is provided to receive a brush holding apparatus 2. For secure and effective cooling of slip ring brushes that can be arranged in the brush holding apparatus 2, it is proposed that the brush holding apparatus 2 has cooling air lines 3 for the targeted supply of cooling air to the slip ring brushes that can be arranged in the brush holding apparatus 2. The brush holding apparatus 2 preferably has cooling air ducts 6, each of which has at least one air inlet opening 11 for collecting cooling air and each at least one air outlet opening 10 for supplying the cooling air collected in the air ducts via the cooling air lines 3 connected to the air outlet openings 10 to the slip ring brushes, each of which can be arranged in brush boxes 4 of the brush holding apparatus 2.

What is claimed is:

1. A slip ring unit for an electrical machine, said slip ring unit comprising:
 a brush holding apparatus including
 brush boxes configured to receive slip ring brushes,
 separate cooling air lines for targeted supply of cooling air separately and directly to each of the slip ring brushes, and
 a brush bridge comprising a first subregion with electrical wiring connected to the slip ring brushes, and a second subregion comprising a cooling air duct,
 said cooling air duct having an air inlet opening for collecting cooling air and separate air outlet openings connected to the separate cooling air lines for the targeted supply of the cooling air; and
 a fan provided as an active cooling system to generate an air volume flow to cool the brush holding apparatus.

2. The slip ring unit of claim 1, further comprising supply air ducts which are supplied via separate cooling air openings in the form of an air inlet opening on the slip ring unit.

3. The slip ring unit of claim 1, wherein the fan is provided to substantially dispel heated air and thereby establish the active cooling system in interaction with the cooling air lines.

4. The slip ring unit of claim 1, further comprising:
 a slip ring housing having an air inlet opening; and
 a supply air duct connected to the air inlet opening of the slip ring housing and the air inlet opening of the cooling duct for supply of cooling air to the cooling air duct.

5. An electrical machine, comprising a slip ring unit, said slip ring unit comprising a brush holding apparatus including brush boxes configured to receive slip ring brushes, said brush holding apparatus including separate cooling air lines for targeted supply of cooling air separately and directly to each of to the slip ring brushes, and a brush bridge comprising a first subregion with electrical wiring connected to the slip ring brushes, and a second subregion comprising a cooling air duct, said cooling air duct having an air inlet opening for collecting cooling air and separate air outlet openings connected to the separate cooling air lines for the targeted supply of the cooling air, said slip ring unit comprising a fan provided as an active cooling system to generate an air volume flow to cool the brush holding apparatus.

6. The electrical machine of claim 5, wherein the slip ring unit includes supply air ducts which are supplied via separate cooling air openings in the form of an air inlet opening on the slip ring unit.

7. The electrical machine of claim 5, wherein the fan is provided to substantially dispel heated air and thereby establish the active cooling system in interaction with the cooling air lines.

8. The electrical machine of claim 5, wherein the slip ring unit includes a slip ring housing having the air inlet opening, and a supply air duct connected to the air inlet opening of the slip ring housing and the air inlet opening of the cooling duct for supply of cooling air to the cooling air duct.

\* \* \* \* \*